US005460862A

United States Patent [19]

Roller

[11] Patent Number: 5,460,862

[45] Date of Patent: Oct. 24, 1995

[54] SPACER

[75] Inventor: Ulrike Roller, Pfullendorf Aach-Linz, Germany

[73] Assignee: Thermix GmbH Isolierungssysteme für Verglasungen, Altshausen, Germany

[21] Appl. No.: 165,036

[22] Filed: Dec. 10, 1993

[30] Foreign Application Priority Data

| | | | |
|---|---|---|---|
| Dec. 10, 1992 | [DE] | Germany | 42 41 591.8 |
| Mar. 16, 1993 | [DE] | Germany | 9303795 U |

[51] Int. Cl.$^{6}$ .............. B29D 22/00; E06B 3/24

[52] U.S. Cl. .............. 428/35.7; 428/34; 428/35.8; 428/36.3; 428/36.5; 428/36.6; 428/141; 428/167; 428/182; 428/192; 428/398; 52/786.13

[58] Field of Search .............. 428/34.1, 34, 35.7, 428/35.8, 36.3, 36.5, 36.6, 36.7, 36.91, 107, 131, 137, 141, 156, 167, 172, 182, 192, 364, 398; 52/172, 789, 171.3, 790; 156/109

[56] References Cited

U.S. PATENT DOCUMENTS

| | | | |
|---|---|---|---|
| 4,745,711 | 5/1988 | Box | 56/172 |
| 5,079,054 | 1/1992 | Davies | 428/35.8 |
| 5,094,055 | 3/1992 | Berdan | 52/397 |

FOREIGN PATENT DOCUMENTS

| | | |
|---|---|---|
| 0127739 | 3/1984 | European Pat. Off. . |
| 0430889 | 11/1990 | European Pat. Off. . |
| 2438150 | 4/1980 | France . |
| 2856317 | 12/1978 | Germany . |
| 2932244 | 8/1979 | Germany . |
| 2929544 | 1/1981 | Germany . |
| 8204453 | 2/1982 | Germany . |
| 3302659 | 1/1983 | Germany . |
| 3403275 | 1/1984 | Germany . |
| 3400891 | 1/1984 | Germany . |
| 9214799 | 10/1992 | Germany . |
| 1579726 | 11/1980 | United Kingdom . |
| 2162228 | 1/1986 | United Kingdom . |
| 9100409 | 1/1991 | WIPO . |

*Primary Examiner*—Donald J. Loney
*Attorney, Agent, or Firm*—Robert W. Becker & Associates

[57] ABSTRACT

A spacer made of plastic material for building components, having at least two spaced apart panes that are fixedly connected to one another, consists of a hollow profiled member that is positioned between the panes. The hollow profiled member has sidewalls facing the panes, an interior wall facing the interior chamber between the panes, and an exterior wall facing outwardly. At least one first insert for inhibiting water vapor diffusion is provided. The at least one first insert is embedded in the sidewalls and the exterior wall. A second insert is embedded in the interior wall and is preferably of a material that inhibits water vapor diffusion, preferably a thin-walled foil made of metal or plastic.

25 Claims, 4 Drawing Sheets

SPACER

BACKGROUND OF THE INVENTION

The present invention relates to a spacer in the form of a hollow profiled member made of plastic for building components that comprise two or more glass panes or similar plates (panes) spaced apart from one another and connected fixedly to one another, especially for insulating windows, panels, etc., with at least one insert (inlay) that inhibits water vapor diffusion and is embedded in the two sidewalls facing the glass panes as well as in the exterior (outwardly facing) wall of the hollow profiled member.

From German Offenlegungsschrift 33 02 659 a spacer of the aforementioned kind is known. In order to prevent that moisture can reach the drying agent contained in the spacer through the sealing material, the exterior wall that is facing the sealing agent as well as the two sidewalls facing the glass panes are provided with a vapor lock in the form of a metalized foil or film. With this measure the walls are also stiffened; however, the interior wall of the hollow profiled member of the spacer can be deformed over time, especially due to temperature fluctuations, chemical exposure or radiation (exposure to the sun) so that the spacer can no longer fulfill the required function, i.e., the prevention of gas exchange between the atmosphere and the interior chamber of the insulating window.

It is therefore an object of the present invention to improve the spacer of the aforementioned kind such that the interior wall facing the interior chamber of the building component has a higher stiffness so that deformations and resulting leaks can be prevented and a long service life of the spacer over an extended period of time is ensured. The required constructive expenditure should be minimal; however, positional changes of the interior wall of the spacer should be substantially impossible.

BRIEF DESCRIPTION OF THE DRAWINGS

This object, and other objects and advantages of the present invention will appear more clearly from the following specification in conjunction with the accompanying drawings, in which.

SUMMARY OF THE INVENTION

Figure 1:
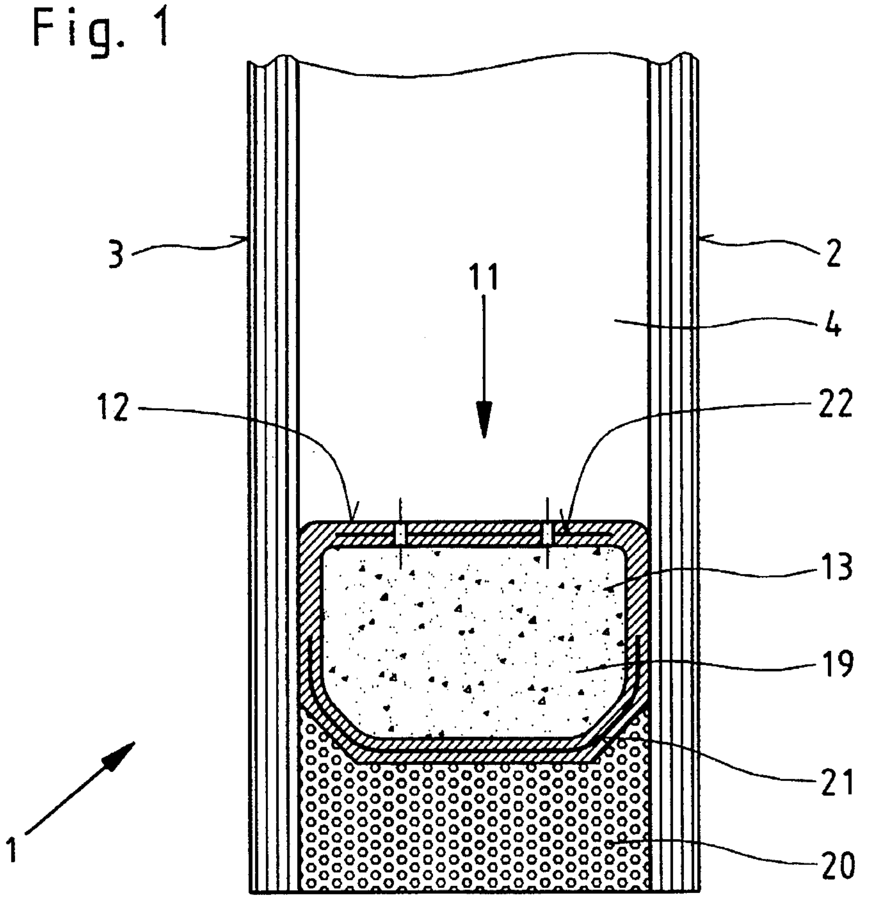
FIG. 1 shows an insulating window with a spacer arranged between the panes and with a foil inserted into the interior wall of the spacer.
Figure 2:
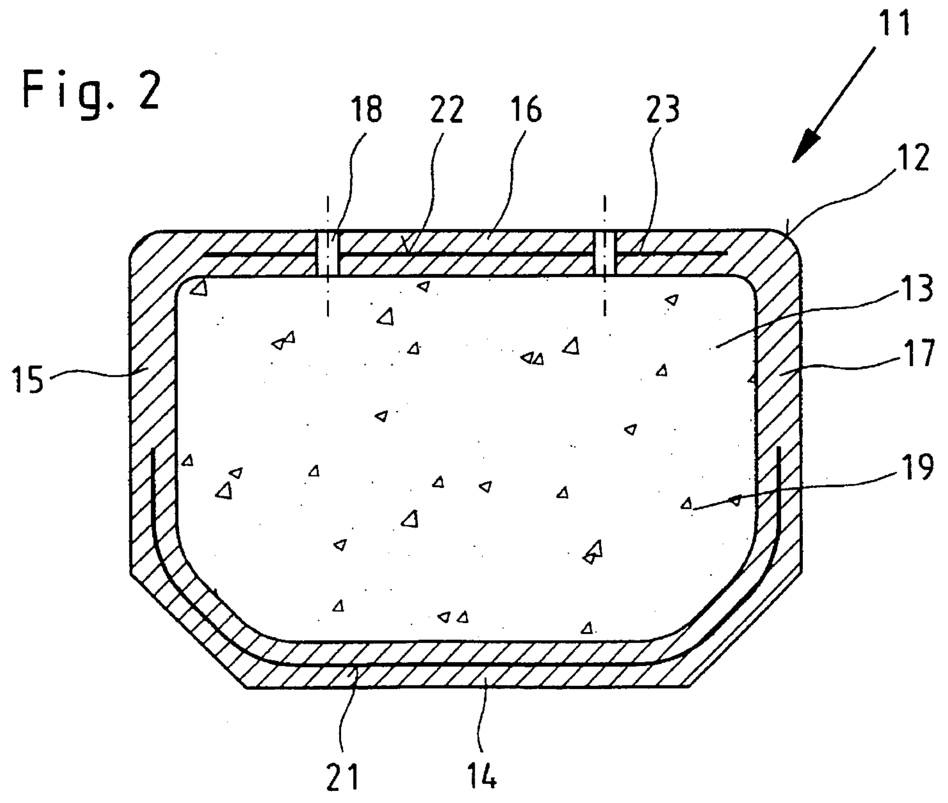
FIG. 2 shows the spacer of FIG. 1 in an enlarged view.

The spacer made of plastic material for building components, comprising at least two spaced apart panes that are fixedly connected to one another, is primarily comprised of:

A hollow profiled member to be positioned between the panes, the hollow profiled member having sidewalls facing the panes, an interior wall facing an interior chamber between the panes, and an exterior wall facing outwardly;

At least one first insert (inlay) for inhibiting water vapor diffusion, the at least one first insert embedded in the sidewalls and the exterior wall; and A second insert (inlay) embedded in the interior wall.

Preferably, the second insert is comprised of a material that inhibits water vapor diffusion.

Advantageously, the second insert is centrally positioned within the interior wall.

Preferably, the second insert is a thin-walled foil.

The foil is preferably pretreated and may be a metal foil or a plastic foil.

Advantageously, the second insert has a substantially rectangular cross-section. Preferably, the second insert has a thickness of less than 0.5 mm.

Expediently, the second insert extends substantially over an entire width of the interior wall.

In a preferred embodiment of the present invention, the second insert is in the form of at least one reinforcement member extending in an axial direction of the hollow profiled member. The reinforcement member is preferably selected from the group consisting of a wire, a cable, and a pipe. The reinforcement member is made of plastic or metal.

Preferably, the reinforcement member in the form of a cable is made of stranded wire that is twisted.

The reinforcement member advantageously is made of a spirally wound wire made of material selected from the group consisting of steel and aluminum.

Advantageously, the reinforcement element is centrally positioned within the interior wall.

Advantageously, the spacer further comprises at least one partition for dividing the interior of the hollow profiled member into compartments, wherein the reinforcement member is positioned in an area where the at least one partition and the interior wall meet.

Preferably, at least one of the sidewalls has anchoring elements on an outwardly facing surface for engaging a sealing material.

The anchoring elements are selected from at least one of the elements of the group consisting of:

Reinforcements extending laterally from the hollowed profiled member;

First projections having undercuts and extending from the hollow profiled member toward the panes;

Second projections extending into the interior chamber;

Undercuts in the sidewalls;

Corrugations; and

Grooves.

Preferably, the second projections have undercuts.

Expediently, the exterior wall has corrugations to provide anchoring.

Advantageously, the grooves extend in a longitudinal direction of the hollow profiled member.

In a preferred embodiment of the present invention, the hollow profiled member has an interior filled with a drying agent and the interior wall has at least one throughbore.

Advantageously, the spacer is made of a material selected from the group consisting of acrylonitrile-styrene-acrylic ester, polycarbonate blend, and foamed polycarbonate.

According to the present invention, the improvement of the aforementioned spacer is achieved by providing an insert (inlay) embedded in the interior wall of the hollow profiled member facing the interior chamber of the building component.

In a preferred embodiment the insert may be comprised of a material that inhibits water vapor diffusion and may be in the form of a thin-walled, preferably chemically pretreated foil made of metal or plastic material, whereby the insert in cross-section is substantially rectangular, has a material thickness of less than 0.5 mm, and extends substantially over the entire width of the interior wall of the hollow profiled member.

In another embodiment of the present invention, the interior wall facing the interior chamber of the building component is in the form of at least one reinforcement member extending in the axial direction of the hollow profiled member.

The reinforcement member may be embodied in the form of a cable or a wire piece or pipe piece made of metal or plastic, whereby a cable made of stranded wire is twisted in order to increase the surface and thus improve adhesion. The reinforcement member may also be comprised of a spiral wire or made of steel or aluminum.

The reinforcement member of the hollow profiled member may be arranged centrally or within the area where partitions dividing the interior meet the interior wall.

It is furthermore advantageous that one or both sidewalls of the hollow profiled member have anchoring elements at the outwardly facing surface for engaging sealing materials.

The anchoring elements may be in the form of projections with undercuts that extend in the direction of the glass panes, in the form of laterally projecting reinforcements and/or projections that extend into the interior chamber of the component, in the form of recesses provided at these projections and/or the sidewalls of the hollow profiled member and/or in the form of corrugations provided at one or both sidewalls as well as at the exterior wall, machined into the sidewalls and exterior wall, respectively, applied thereto, or grooves that extend preferably in the longitudinal direction of the hollow profiled member.

It is furthermore suggested that the interior of the hollow profiled member be filled with a drying agent and that the interior wall facing the interior chamber of the building component is provided with at least one throughbore. Furthermore, the spacer should be comprised of acrylonitrile-styrene-acrylic ester, polycarbonate blends, or foamed polycarbonate.

When a spacer is embodied according to the present invention, the strain and stress present within the hollow profiled member can be compensated without difficulties and the interior wall facing the interior chamber of the component can be stabilized and stiffened so that it cannot be deformed, but instead remains in its position and thus prevents a gas exchange between the atmosphere and the interior chamber of the building component. Furthermore, due to the embodiment of the outer surface of the spacer the spacer is fixedly connected with the sealing materials, so that a high service life with an always satisfactory operation is thus ensured. The constructive expenditure with which this goal is to be achieved is low so that the inventively suggested spacer is economical to manufacture, and can be used in many ways with differently designed building components.

The special plastic material acrylonitrile-styrene-acrylic ester, polycarbonate blend or foam polycarbonate, in connection with a chemically pretreated aluminum foil, that is arranged homogeneously in the center of the wall cross-section, is especially suitable as a spacer because it has the following properties:

High stiffness (stability),

Stability of shape up to 100° C.,

High impact resistance at cold temperatures,

Optimal insulation values,

Diffusion of media through the spacer is not observed, therefore no condensation occurs within the interior chamber of an insulating window due to moisture; furthermore, the leakage of special gases such as noble gases, in particular argon or krypton, which are often provided to increase insulation, from the interior chamber of an insulating window is prevented, The spacer is water vapor-tight due to the aluminum foil; the chemical base material achieves a permanent connection to the butyl and silicone adhesives as well as polyurethane and polysulfide and silicone sealing materials which are commonly used in the manufacture of multiple pane insulating windows, The material in its special admixture has a high resistance with respect to strong UV radiation of the sun.

DESCRIPTION OF PREFERRED EMBODIMENTS

The present invention will now be described in detail with the aid of several specific embodiments utilizing FIGS. 1 through 8.

Figure 3:
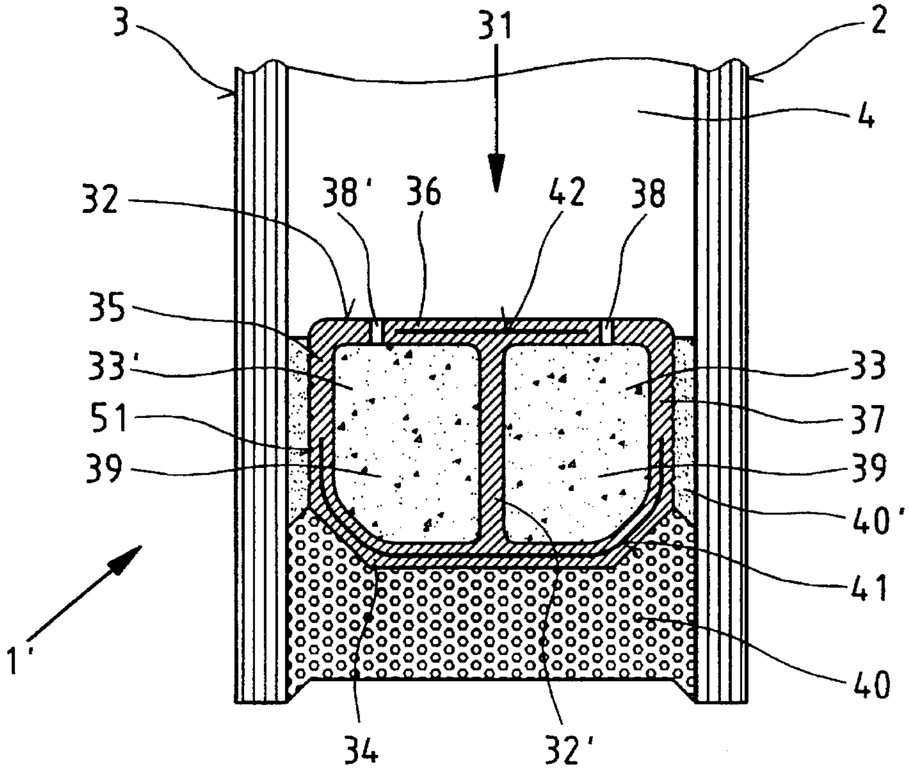
FIGS. 3, 4 show the insulating window of FIG. 1 with differently embodied spacers, respectively.
Figure 4:
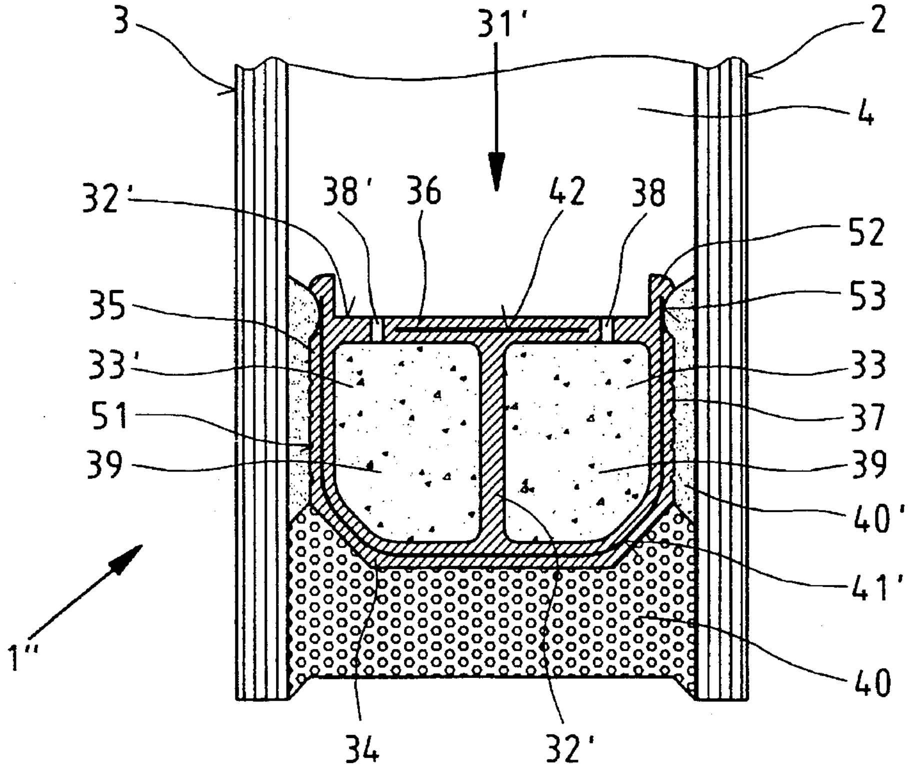

The insulating window, represented in FIGS. 1, 3 and 4 and indicated with reference numeral 1, 1', respectively, 1", is comprised of two insulating glass panes 2 and 3 spaced apart at a distance and defining an interior chamber 4. Between the two insulating glass panes 2 and 3 a spacer 11 is arranged which is a hollow profiled member 12 and has an interior 13 which receives a drying agent 19. With a sealing material 20 the spacer 11 is fixedly connected to the two insulating glass panes 2 and 3.

In order to prevent moisture from reaching the interior 13 of the hollow profile 12 enclosed by the four walls 14, 15, 16, and 17 and the interior chamber 4 of the insulating window 1, the exterior wall 14 has an insert (inlay) 21 in the form of a foil made out of a material that inhibits water vapor diffusion, such as metal or plastic, which foil also extends partially into the sidewalls 15 and 17. Furthermore, the interior wall 16 of the hollow profiled member 13 has an insert (inlay) 22 embedded therein which is also comprised of a foil 23 with which the interior wall 16 is stiffened and is thus more form-stable. Only moisture that is contained in the interior chamber 4 of the insulating window 1 can thus enter via the openings 18, provided in the interior wall 16, into the interior 13 of the hollow profiled member 12 containing the drying agent 19. A long service life of the spacer 11 as well as of the insulating window 1 is thus ensured.

The insulating window 1' according to FIG. 3 is comprised of a spacer 31 having a hollow profiled member 32 that is divided by a partition 32' into two interior compartments 33 and 33'. Each of the two interior compartments 33 and 33' is connected via openings 38, 38' in the interior wall 36 with the interior chamber 4 of the insulating window 1'.

In this embodiment an insert (inlay) 41 is also embedded in the exterior wall 34 which extends further into the two sidewalls 35 and 37 of the hollow profiled member 32. Furthermore, an insert 42 is embedded in the interior wall 36 and is comprised of a foil so that only moisture from the interior chamber 4 of the insulating window 1' can enter the interior compartments 33 and 33' containing the drying agent 39. In order to be able to fixedly connect the spacer 31 with the panes 2 and 3, the outer surfaces of the sidewalls 35 and 37 are provided with corrugations 51 which engage the sealing material 40'.

In the spacer 31' according to FIG. 4 the sidewalls 35 and 37 of the hollow profiled member 32' are extended by projections 52 that have undercuts or recesses 53.

In this manner it is ensured that the sealing material 40' that is applied in the form of a bead on the panes 2 and 3 is evenly distributed. The sealing materials 40 and 40' may be adhesives based on polyurethane or polysulfide or silicone, respectively, butyl or silicone adhesives. Due to the projections 52 the hollow profiled member 32' is additionally stiffened, especially due to the fact that the insert 41' that is embedded within the exterior wall 34 as well as within the two sidewalls 35 and 37, extends into the projections 52.

Figure 5:
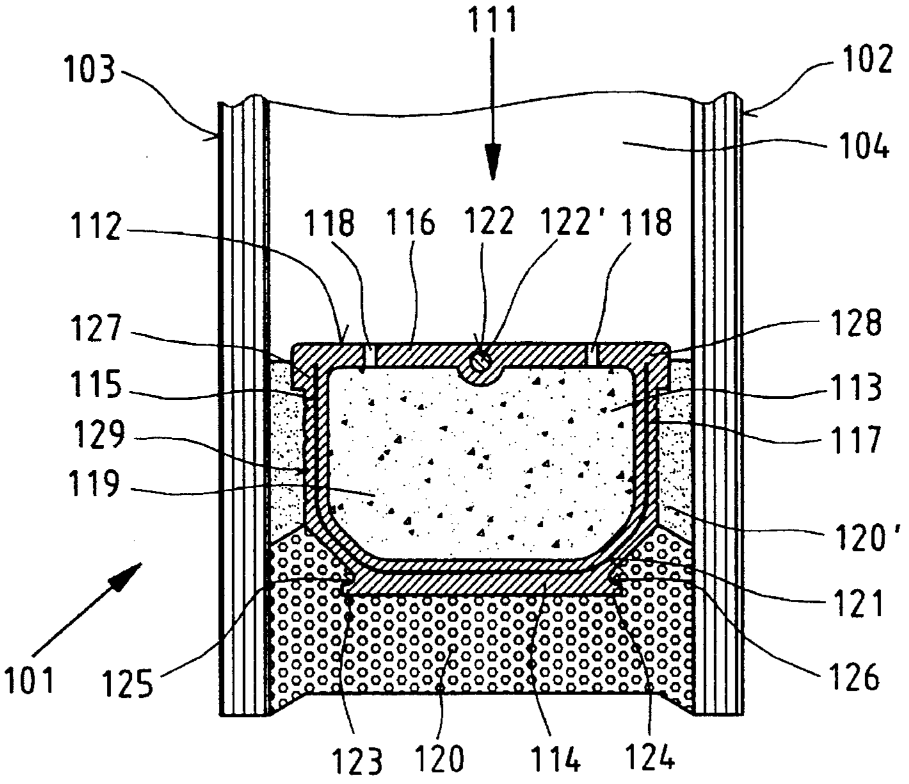
FIG. 5 shows an insulating window with a spacer having a reinforcement member.

The insulating window 101 according to FIG. 5 is also comprised of two panes 102 and 103 that are fixedly connected to one another with the hollow profiled member 112 being the spacer 111. The interior wall 116 of the hollow profiled member 112 has embedded therein an insert (inlay) 122 in the form of a reinforcement member, for example, in the form of a wire 122' that extends in the longitudinal direction of the spacer 111. Furthermore, at the two sidewalls 115 and 117 reinforcements 127 and 128 are formed which not only result in good anchoring within the sealing material 120', but also provide for a stiffening of the interior wall 116. Furthermore, at the sidewalls 115 and 117, in the area of the outer wall 114, respectively, at the exterior wall 114, projections 123 and 124 are provided with which undercuts 125 and 126 are formed. The spacer 111 is thus fixedly anchored within the sealing material 120, especially since the exterior surface of the sidewalls 115, 117 is provided with corrugation 129.

The interior chamber 104 of the insulating window 101 is connected via openings 118 provided in the interior wall 116 of the hollow profiled member 112 with its interior 113 that contains the drying agent 119. In order to prevent moisture from entering the interior 113, the exterior wall 114 as well as the two sidewalls 115 and 117 have embedded therein an insert 121 made of a material that inhibits water vapor diffusion and thus provides protection against moisture.

Figure 6:
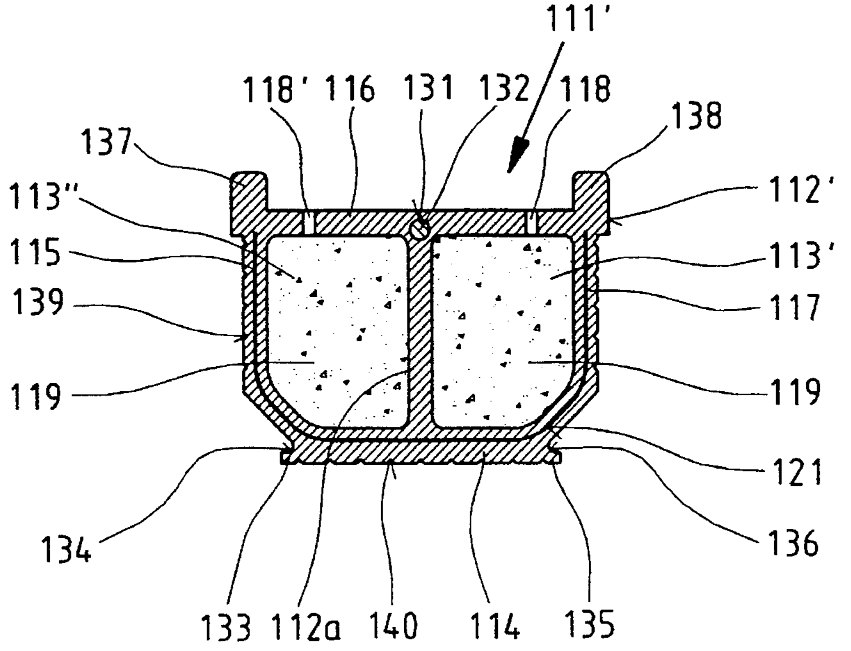
FIGS. 6, 7 show variants of the spacer of FIG. 5.

According to FIG. 6 the hollow profiled member 112' of the spacer 111' is divided by a partition **112*a* into two interior compartments 113' and 113" which are connected via openings 118 and 118' provided in the interior wall 116 with the interior chamber 104 of the insulating window 101. Furthermore, the interior wall 116 in the area of the partition 112*a* is provided with an insert in the form of a reinforcement member 131, for example, in the form of a wire 132. At the sidewalls 115 and 117 projections 137 and 138 are formed that extend into the interior chamber 104. The interior wall 116** is thus embodied as a form-stable wall.

Figure 8:
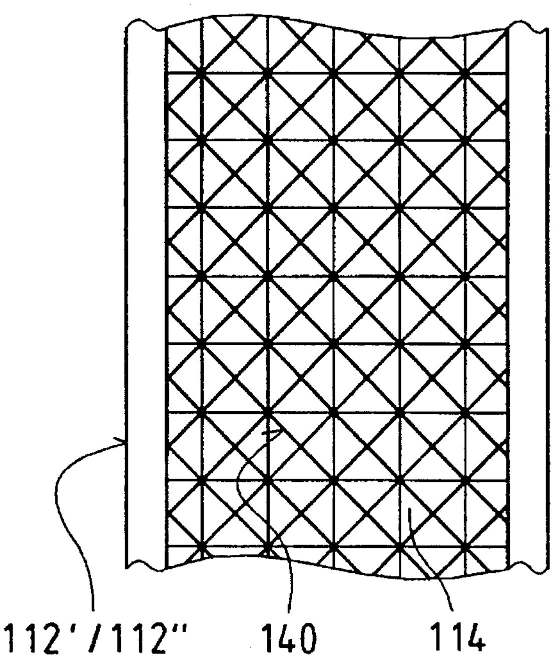
FIG. 8 shows the spacer according to FIGS. 6 and 7 with corrugations on the exterior wall.

Further projections 133 and 135 are provided at the side of the hollow profiled member 112' opposite the two projections 137 and 138 with which undercuts 134 and 136 are formed. A secure anchoring in a sealing material is thus ensured, especially in view of the two outer surfaces of the sidewalls 115 and 117 as well as of the exterior wall 114 being provided with a corrugation 139, respectively, 140, as can be seen in FIG. 8.

Figure 7:
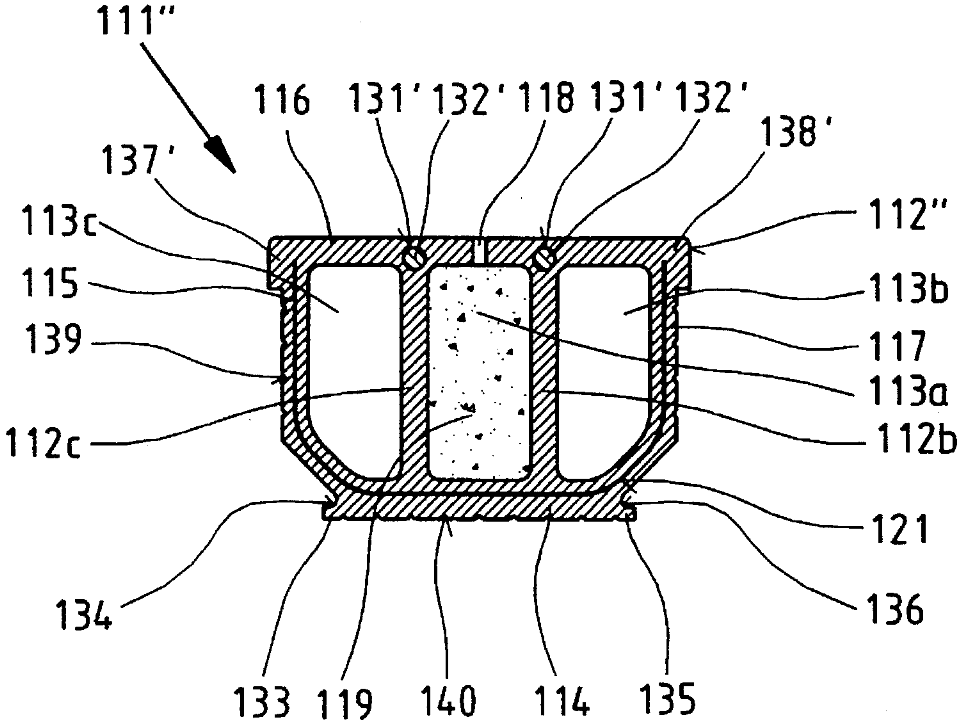

In the spacer 111" according to FIG. 7 the hollow profiled member 112" is divided by two partitions **112*b* and 112*c* into three interior compartments 113*a*, 113*b*, and 113*c* whereby the centrally located interior compartment 113*a*, which is in connection with the interior chamber 104 of the insulating window 101 via openings 113 provided in the interior wall 116, contains the drying agent 119. Furthermore, in the area where the partitions 112*b* and 112*c* meet the interior wall 116 inserts 131' in the form of reinforcement members such as wires 132' are embedded. Reinforcements 137' and 138' are provided. The spacer 111"** thus also exhibits high stiffness (stability) and prevents reliably diffusion of moisture into the interior chamber.

The present invention is, of course, in no way restricted to the specific disclosure of the specification and drawings, but also encompasses any modifications within the scope of the appended claims.

What I claim is:

1. A spacer made of plastic material for building components comprising at least two spaced apart panes that are fixedly connected to one another, said spacer comprising:

a hollow profiled member to be positioned between the panes, said hollow profiled member having sidewalls facing the panes, an interior wall facing an interior chamber between the panes, and an exterior wall facing outwardly;

at least one first insert for inhibiting water vapor diffusion, said at least one first insert embedded in said sidewalls and said exterior wall; and a second insert embedded in said interior wall.

2. A spacer according to claim 1, wherein said second insert is comprised of a material that inhibits water vapor diffusion.

3. A spacer according to claim 2, wherein said second insert is centrally positioned within said interior wall.

4. A spacer according to claim 1, wherein said second insert is a thin-walled foil.

5. A spacer according to claim 4, wherein said foil is pretreated.

6. A spacer according to claim 4, wherein said foil is a metal foil.

7. A spacer according to claim 4, wherein said foil is a plastic foil.

8. A spacer according to claim 1, wherein said second insert has a substantially rectangular cross-section.

9. A spacer according to claim 1, wherein said second insert has a thickness of less than 0.5 mm.

10. A spacer according to claim 1, wherein said second insert extends substantially over an entire width of said interior wall.

11. A spacer according to claim 1, wherein said second insert is in the form of at least one reinforcement member extending in an axial direction of said hollow profiled member.

12. A spacer according to claim 11, wherein said reinforcement member is selected from the group consisting of a wire, a cable, and a pipe.

13. A spacer according to claim 12, wherein said reinforcement member is made of plastic.

14. A spacer according to claim 12, wherein said reinforcement member is made of metal.

15. A spacer according to claim 12, wherein said cable is made of stranded wire that is twisted.

16. A spacer according to claim 11, wherein said reinforcement member is made of a spirally wound wire made of a material selected from the group consisting of steel and aluminum.

17. A spacer according to claim 11, wherein said reinforcement member is centrally positioned within said interior wall.

18. A spacer according to claim 11, further comprising at least one partition for dividing an interior of said hollow profiled member into compartments, wherein said reinforcement member is positioned in an area where said at least one partition and said interior wall meet.

19. A spacer according to claim 1, wherein at least one of said sidewalls has anchoring elements on an outwardly facing surface for engaging a sealing material.

20. A spacer according to claim 19, wherein said anchoring elements are selected from at least one of the elements of the group consisting of:

reinforcements extending laterally from said hollow profiled member;

first projections having undercuts and extending from said hollow profiled member toward the panes;

second projections extending into said interior chamber;

undercuts in said sidewalls;

corrugations; and grooves.

21. A spacer according to claim 20, wherein said second projections have undercuts.

22. A spacer according to claim 20, wherein said exterior wall has corrugations to provide anchoring.

23. A spacer according to claim 20, wherein said grooves extend in a longitudinal direction of said hollow profiled member.

24. A spacer according to claim 1, wherein said hollow profiled member has an interior filled with a drying agent and wherein said interior wall has at least one throughbore.

25. A spacer according to claim 1, wherein said spacer is made of a material selected from the group consisting of acrylonitrile-styrene-acrylic ester, polycarbonate blend, and foamed polycarbonate.

* * * * *